United States Patent
Lee et al.

(10) Patent No.: US 10,764,512 B2
(45) Date of Patent: Sep. 1, 2020

(54) METHOD OF IMAGE FUSION ON CAMERA DEVICE EQUIPPED WITH MULTIPLE CAMERAS

(71) Applicant: MEDIATEK INC., Hsin-Chu (TW)

(72) Inventors: Ping-Han Lee, Hsin-Chu (TW); Te-Hao Chang, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/296,317

(22) Filed: Mar. 8, 2019

(65) Prior Publication Data

US 2019/0297275 A1    Sep. 26, 2019

Related U.S. Application Data

(60) Provisional application No. 62/647,915, filed on Mar. 26, 2018.

(51) Int. Cl.
| | | |
|---|---|---|
| *H04N 5/232* | (2006.01) | |
| *H04N 5/225* | (2006.01) | |
| *H04N 5/265* | (2006.01) | |
| *H04N 5/247* | (2006.01) | |
| *H01L 27/146* | (2006.01) | |

(52) U.S. Cl.
CPC ......... *H04N 5/265* (2013.01); *H04N 5/23229* (2013.01); *H04N 5/23296* (2013.01); *H04N 5/247* (2013.01); *H04N 5/2258* (2013.01)

(58) Field of Classification Search
CPC ............. H04N 5/2258; H04N 5/23296; H04N 5/23229; H04N 5/265; H04N 5/247; H01L 27/1462; H01L 27/1464

USPC ............. 348/240.99, 240.2, 262, 222.1, 159, 348/207.99, 239, 597, 554, 668, 702; 382/284, 294, 302, 318; 396/379

See application file for complete search history.

(56) References Cited

U.S. PATENT DOCUMENTS

| | | | |
|---|---|---|---|
| 9,325,899 B1 | 4/2016 | Chou et al. | |
| 9,485,432 B1 * | 11/2016 | Medasani | H04N 5/23232 348/240.2 |
| 10,356,300 B2 * | 7/2019 | Lee | H04N 5/2258 348/240.2 |
| 10,506,147 B2 | 12/2019 | Malone et al. | |
| 2004/0075741 A1 * | 4/2004 | Berkey | H04N 7/181 348/143 |
| 2011/0242356 A1 * | 10/2011 | Alekic | H04N 5/228 348/218.1 |

(Continued)

*Primary Examiner* — Marly S Camargo
(74) *Attorney, Agent, or Firm* — McClure, Qualey & Rodack, LLP

(57) ABSTRACT

A camera device is provided. The camera device includes: a first imaging section, a second imaging section, a third imaging section, and a processor. The first imaging section, second imaging section, and third imaging section capture a first image, a second image, and a third image of a scene with a first field of view (FOV), a second FOV, and a third FOV. The processor is configured to generate a first output image by performing a first image-fusion process on the first image, the second image, and a third image in response to a zooming factor of the camera device being between a first zooming factor and a second zooming factor, wherein the first FOV is wider than the second FOV, and the second FOV is wider than the third FOV, and the second zooming factor is greater than the first zooming factor.

22 Claims, 10 Drawing Sheets

(56) References Cited

U.S. PATENT DOCUMENTS

| | | | | |
|---|---|---|---|---|
| 2012/0081519 A1* | 4/2012 | Goma | .................... | H04N 5/247 |
| | | | | 348/47 |
| 2014/0118584 A1* | 5/2014 | Lee | ........................ | H04N 5/225 |
| | | | | 348/240.99 |
| 2014/0232905 A1* | 8/2014 | Jung | .................... | H04N 5/2258 |
| | | | | 348/239 |
| 2016/0112637 A1* | 4/2016 | Laroia | ................ | H04N 5/23245 |
| | | | | 348/218.1 |
| 2019/0208181 A1* | 7/2019 | Rowell | .............. | H04N 5/23267 |
| | | | | 348/46 |

* cited by examiner

METHOD OF IMAGE FUSION ON CAMERA DEVICE EQUIPPED WITH MULTIPLE CAMERAS

CROSS REFERENCE TO RELATED APPLICATIONS

This application claims the benefit of U.S. Provisional Application No. 62/647,915 filed on Mar. 26, 2018, the entirety of which is incorporated by reference herein.

BACKGROUND OF THE INVENTION

Field of the Invention

The invention relates to a camera, and, in particular, to a camera device and a method for image fusion in a camera device.

Description of the Related Art

Optical zoom is currently one of the most important smartphone camera features that appeals to users. Unfortunately, the physical characteristics of a lens makes it difficult to design a single camera smartphone setup that includes an optical zoom without sacrificing the phone's overall appearance or adding to its thickness.

A wide-angle plus telephoto dual camera module has been developed in recent years and provides the industry with a solution. Since image zooming can be switched between the wide-angle imaging section and the telephoto imaging section in the dual-camera module, the user may have a better experience with a smooth optical zoom function using a smartphone equipped with a wide-angle plus telephoto dual-camera module. The wide-angle lens and telephoto lens are usually referred to as the "wide" lens and the "tele" lens, and the focal length of a wide-angle lens in the wide-angle imaging section is smaller than that of a telephoto lens in the telephoto imaging section. For example, the wide-angle lens may have a shorter focal length, and the telephoto lens may have a longer focal length. Additionally, the wide-angle lens and the telephoto lens may have different FOVs.

In addition, with the advent of technology, some conventional portable electronic devices on the market have been equipped with more than 2 cameras in a single camera module (e.g., rear camera module), where each camera in the camera module may have an individual focal length and FOV. Given that there are three cameras such as the first, second, and third cameras in a camera module, the first camera may have the shortest focal length and the widest FOV, and the second camera may have the second shortest focal length and the second-widest FOV, and the third camera may have the longest focal length and the narrowest FOV. However, these conventional portable electronic devices cannot efficiently use images captured by the first, second, and third cameras while performing digital zooming, resulting in poorer image quality.

Accordingly, there is a need for a camera device and a method for image fusion in a camera device to solve the aforementioned problem.

BRIEF SUMMARY OF THE INVENTION

A detailed description is given in the following embodiments with reference to the accompanying drawings.

In an exemplary embodiment, a camera device is provided. The camera device includes: a first imaging section, a second imaging section, a third imaging section, and a processor. The first imaging section is configured to capture a first image of a scene with a first field of view (FOV). The second imaging section is configured to capture a second image of the scene with a second FOV. The third imaging section is configured to capture a third image of the scene with a third FOV. The processor is coupled to the first imaging section, the second imaging section, and the third imaging section, and is configured to generate a first output image by performing a first image-fusion process on the first image, the second image, and a third image in response to a zooming factor of the camera device being between a first zooming factor and a second zooming factor. The first FOV is wider than the second FOV, and the second FOV is wider than the third FOV, and the second zooming factor is greater than the first zooming factor.

In another exemplary embodiment, a method for image fusion in a camera device is provided. The camera device is equipped with a first imaging section, a second imaging section, and a third imaging section. The method includes the steps of: utilizing the first imaging section, the second imaging section, and the third imaging section to capture a first image, a second image, and a third image of a scene with a first field of view (FOV), a second FOV, and a third FOV, respectively; and generate a first output image by performing a first image-fusion process on the first image, the second image, and a third image in response to a zooming factor of the camera device being between a first zooming factor and a second zooming factor, wherein the first FOV is wider than the second FOV, and the second FOV is wider than the third FOV, and the second zooming factor is greater than the first zooming factor.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims. Terms such as "wide lens", "wide image", and "wide image data" are used herein. These terms are used in the context of a camera device that includes a wide-angle lens and a telephoto lens. It will be understood that terms such as "wide lens", "wide image", and "wide image data" refer to a "wide-angle lens", "wide-angle image", and "wide-angle image data" with respect to a telephoto lens and telephoto image, respectively, as understood by persons skilled in the art.

Figure 1:
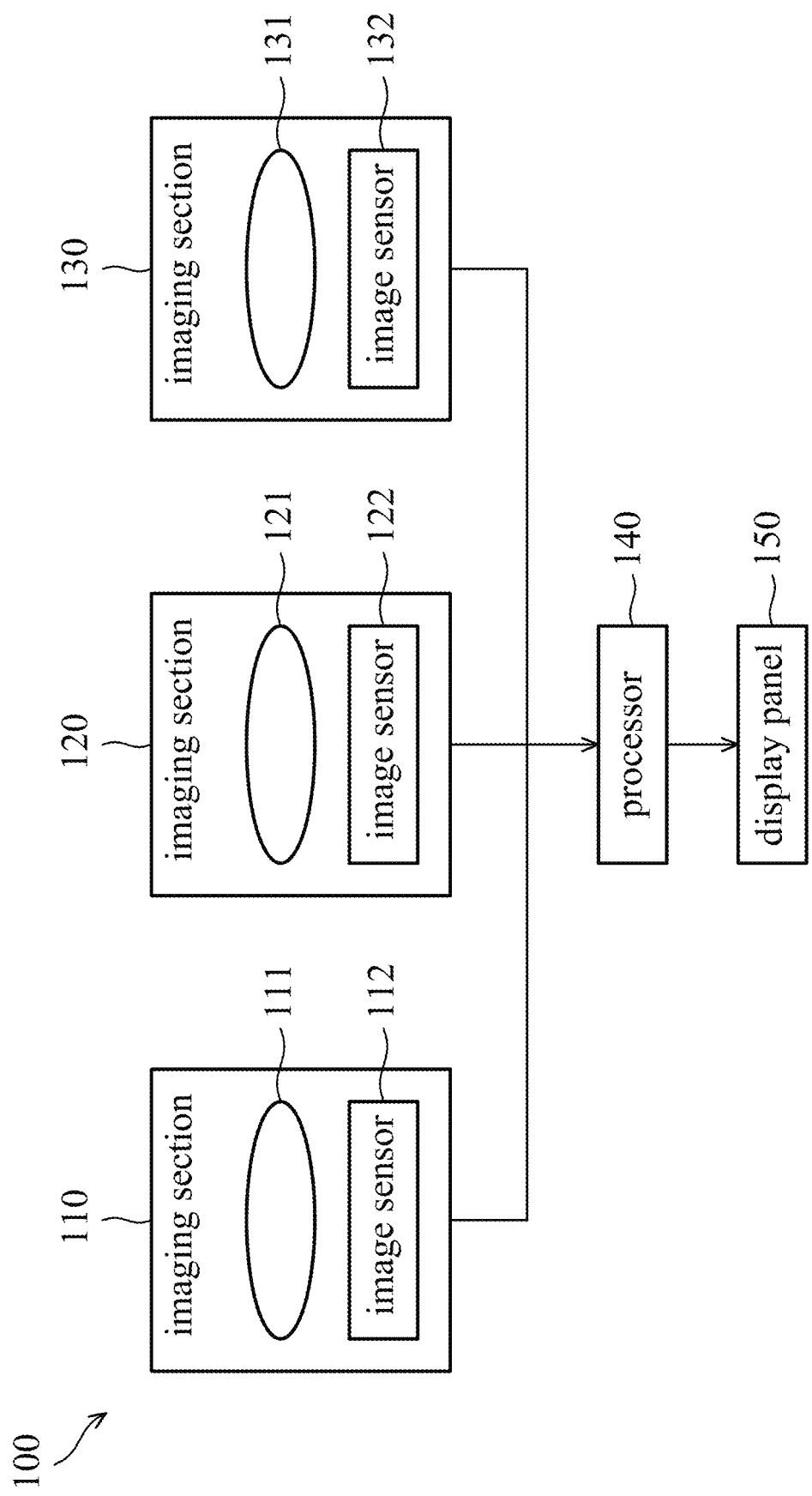
FIG. 1 is a block diagram of a camera device in accordance with an embodiment of the invention.

FIG. 1 is a block diagram of a camera device in accordance with an embodiment of the invention. As shown in FIG. 1, the camera device 100 includes at least three imaging sections and a processor 140. For purposes of description, the number of imaging sections in the camera device 100 is 3, namely, imaging sections 110, 120, and 130.

For example, the imaging section 110 includes a lens 111 and an image sensor 112, and the imaging section 120 includes a lens 121 and an image sensor 122, and the imaging section 130 includes a lens 131 and an image sensor 132. The image sensors 112, 122, and 132 may be physically separate or may be parts of a single larger image sensor, and the resolutions of the image sensors 112, 122, and 132 can be equal to or different from each other. In addition, the field of views (FOVs) and focal lengths of the lenses 111, 121, and 131 may be equal to or different from each other.

The processor 140 may be coupled to the imaging sections 110, 120 and 130, and configured to receive a first image captured by the imaging section 110, a second image captured by the imaging section 120, and a third image captured by the imaging section 130. The processor 140 may be configured to perform corresponding image processing on the first image, second image, and third image during image zooming to achieve a smooth zooming function. Specifically, the processor 140 may generate a preview image that is fused from information obtained by imaging sections 110, 120, and 130 at all zooming levels.

In an embodiment, the camera device 100 may further include a display panel 150 for displaying the preview image. For example, the display panel 150 may be a touch panel, and the processor 140 may render a user interface for the zooming function on the display panel 150. Thus, the user may press on the display panel 150 to adjust the zooming factor for the preview image.

Figure 2A:
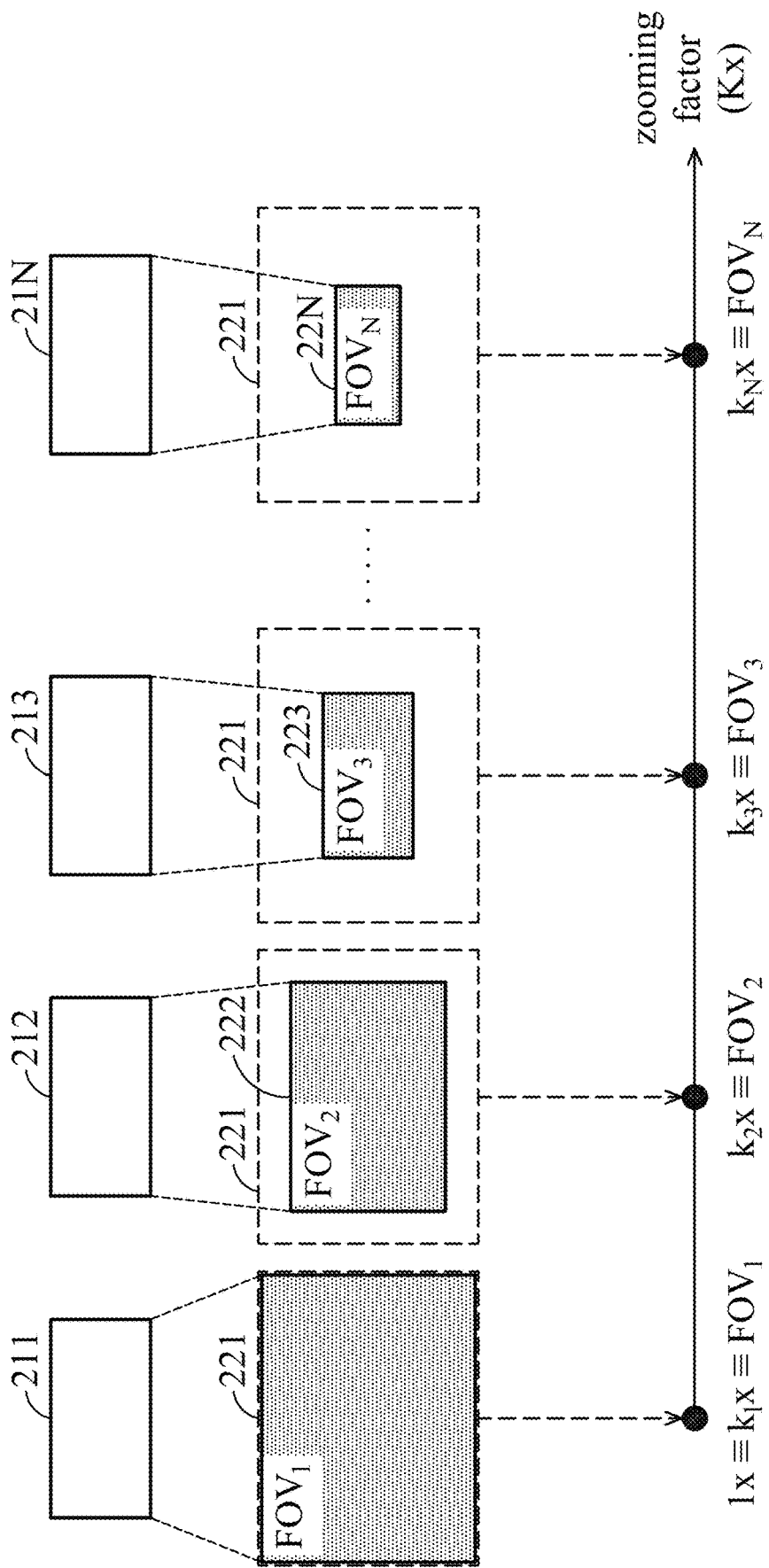
FIG. 2A is a diagram of the relationship between the zooming factor and the FOVs of the imaging sections in the camera device in accordance with an embodiment of the invention.

FIG. 2A is a diagram of the relationship between the zooming factor and the FOVs of the imaging sections in the camera device in accordance with an embodiment of the invention.

In an embodiment, the camera device 100 may include N imaging sections such as imaging sections 211, 212, 213, ..., and 21N. For purposes of description, it is assumed that the resolutions of the image sensors in the imaging sections 211~21N are the same, and the lens in each of the imaging sections 211~21N has a respective FOV, namely, $FOV_1, FOV_2, FOV_3, \ldots,$ and $FOV_N$, as illustrated in blocks 221~22N in FIG. 2A, where $FOV_1 > FOV_2 > FOV_3 > \ldots > FOV_N$. In some embodiments, the focal length of the lens in each of the imaging sections 211~21N may be $FL_1 \sim FL_N$, where $FL_1 < FL_2 < FL_3 < \ldots < FL_N$.

For example, assuming that the imaging section 211 has a zooming factor $k_1$ which is equal to 1, the zooming factors of other imaging sections 212~212N can be calculated as using equation (1):

$$k_N = \frac{\tan\left(\frac{FOV_1}{2}\right)}{\tan\left(\frac{FOV_N}{2}\right)} \text{ where } k = 1 \sim N \quad (1)$$

where $k_N$ denotes the zooming factor of the imaging section 21N; $FOV_1$ denotes the FOV of the imaging section 211; $FOV_N$ denotes the FOV of the imaging section 21N. For example, the zooming factor $k_2$ of the imaging section 212 can be calculated as:

$$k_2 = \frac{\tan\left(\frac{FOV_1}{2}\right)}{\tan\left(\frac{FOV_2}{2}\right)} \quad (2)$$

Specifically, the zooming factor may be a positive number equal to or greater than 1 that is suffixed with an "x". For example, when the zooming factor is changed from $k_1$ (e.g., equal to 1) to $k_2$, the range of $FOV_1$ (i.e., block 221) will be shrunk to block 222 which is the range of $FOV_2$.

Accordingly, the resolution of the image captured by each of the imaging sections 211~21N can be expressed by the "density" of pixels in a unit of angles, such as pixel per angle (PPA). For example, the definition of PPA can be expressed using equation (3):

$$PPA_i = \frac{\#pixel_i}{FOV_i} \quad (3)$$

where $PPA_i$ denotes the PPA of the i-th imaging section; $\#\text{pixel}_i$ denote the number of pixels of the image sensor in the i-th imaging section; $FOV_i$ denotes the FOV of the i-th imaging section.

Accordingly, the number of pixels (i.e., resolution) of the image sensor in each imaging section is proportional to the PPA of each imaging section. In addition, the resolution of the image sensor in each imaging section can be affected by the aperture and some other factors such as the sensor size, pixel size, etc.

The PPA values of the imaging sections 211~21N can be sorted as $PPA_N > \ldots > PPA_2 > PPA_1$. It should be noted that the FOV of each imaging section can be defined in horizontal, vertical, and diagonal directions. In this regard, the variables $PPA_i$ and $FOV_i$ can be substituted as $PPA_i^j$ and $FOV_i^j$, respectively, where j denotes the horizontal, vertical, and diagonal directions.

Figure 2B:
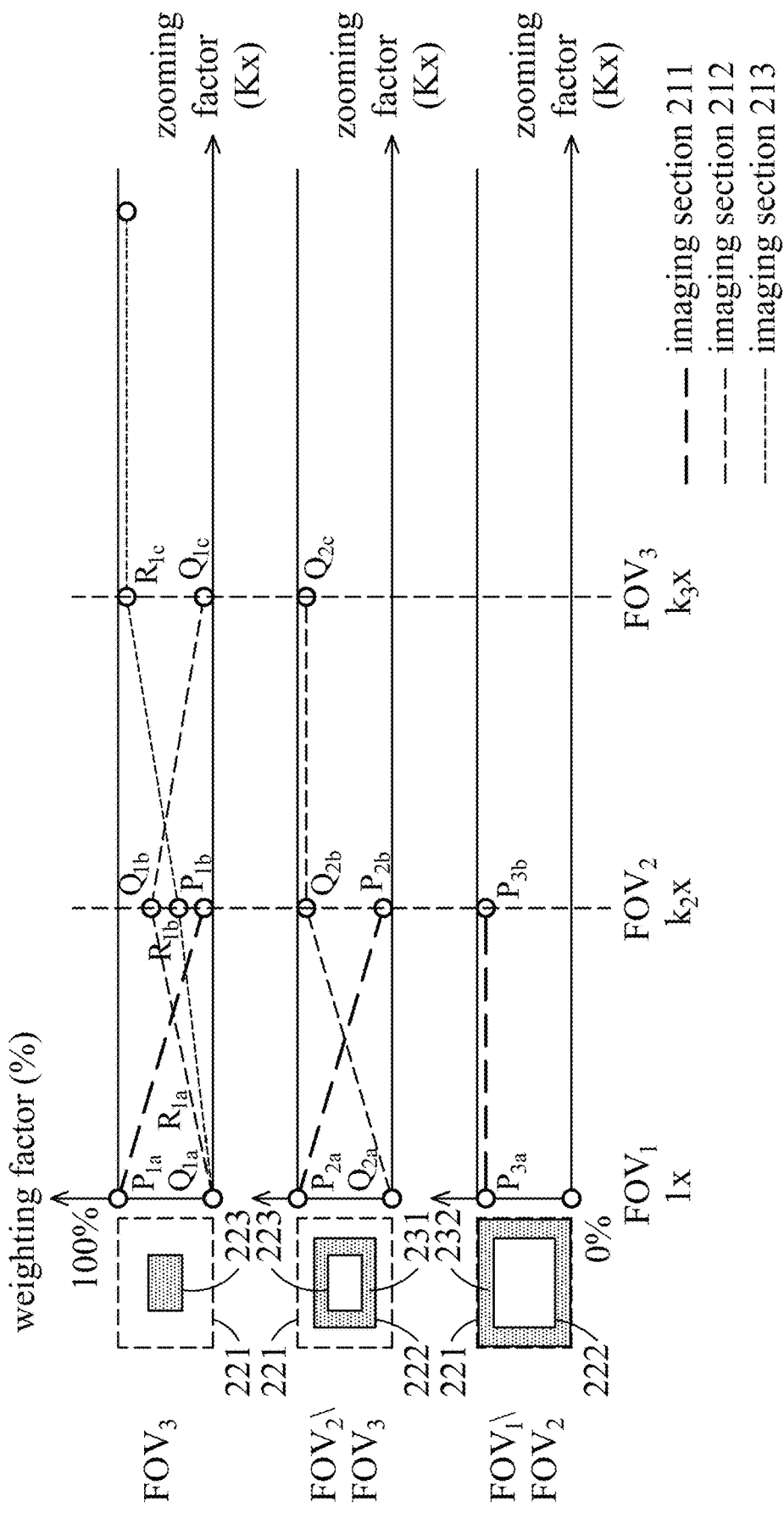
FIG. 2B is a diagram of the image-fusion process using images captured by three imaging sections in accordance with the embodiment of FIG. 2A.
Figure 2C:
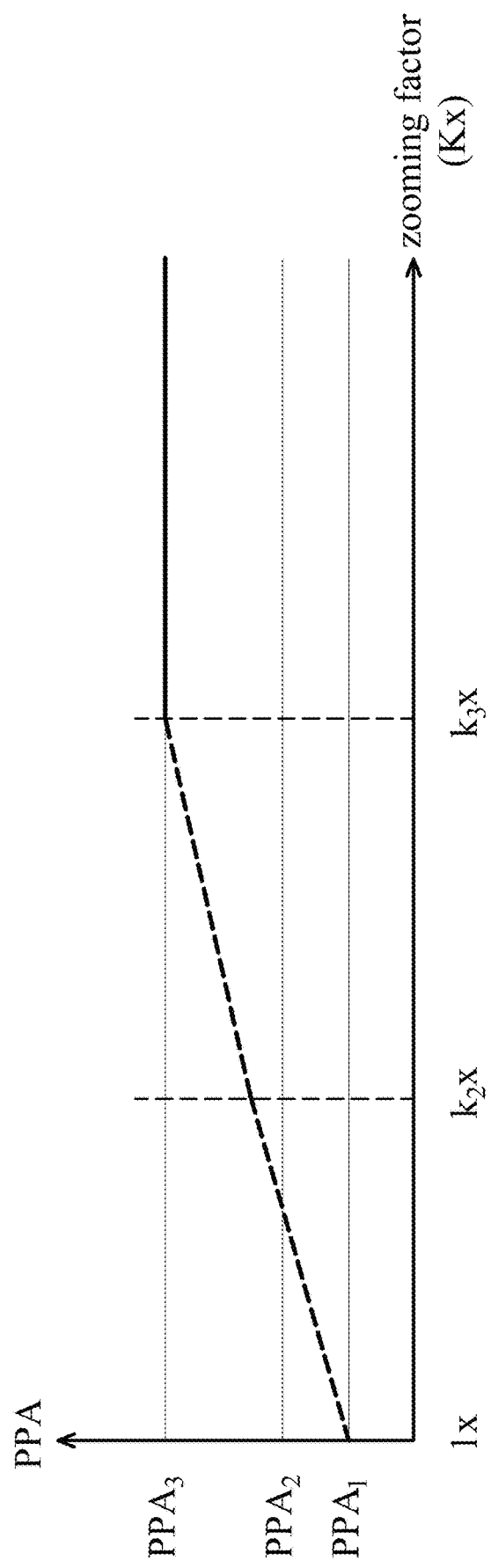
FIG. 2C is a diagram of the overall PPA value of output image with respect to the zooming factor in accordance with the embodiment of FIG. 2B.

FIG. 2B is a diagram of the image-fusion process using images captured by three imaging sections in accordance with the embodiment of FIG. 2A. FIG. 2C is a diagram of the overall PPA value of output image with respect to the zooming factor in accordance with the embodiment of FIG. 2B.

In an embodiment, for purposes of description, the number of imaging sections in the camera device 100 is 3, namely, imaging sections 211, 212, and 213. The imaging sections 211, 212, 213 have PPA values $PPA_1$, $PPA_2$, and $PPA_3$, respectively. The FOVs of the imaging sections 211, 212, and 213 are shown in FIG. 2A, where the $FOV_1$ of the imaging section 211 corresponds to the zooming factor of 1x, and the $FOV_2$ of the imaging section 212 corresponds to the zooming factor of $k_2x$, and the $FOV_3$ of the imaging section 213 corresponds to the zooming factor of $k_3x$. The relationship of the PPA values $PPA_1$, $PPA_2$, $PPA_3$ of the imaging sections 211, 212, and 213 with respect to the zooming factor Kx is shown in FIG. 2C. In addition, in the embodiment, the FOV1, FOV2, and FOV3 of the imaging sections 211, 212, and 213 are illustrated as blocks 211, 212, and 21N in FIG. 2A, respectively.

Specifically, the imaging sections 211, 212, and 213 may be designed for different focal lengths and FOVs. For example, referring to FIG. 2A, block 222 shows the range of $FOV_2$ that is inside block 221 (i.e., $FOV_1$), and block 223 shows the range of $FOV_3$ that is inside block 221 (i.e., $FOV_1$). In addition, the range of $FOV_3$ is narrower than that of $FOV_2$. It should be noted that the imaging section 213 may have the highest PPA value among three imaging sections 211~213 because the image sensors in the imaging sections 211~213 may have the same resolution (i.e., the same number of pixels) and the imaging section 213 has the narrowest FOV of $FOV_3$.

Thus, different image fusion processes can be performed to different regions inside the range of $FOV_1$, as illustrated in FIG. 2B. For example, $FOV_1$ (i.e., block 221) can be divided into a first region, a second region, and a third region. The first region may be $FOV_3$, and the second region (i.e., block 231) may be a region inside FOV2 and outside $FOV_3$, and the third region (i.e., block 232) may be a region inside $FOV_1$ and outside $FOV_2$. Additionally, the output image generated by the processor 140 can be formed by the image-fusion results of the first region, second region, and third region, namely, the first output image, second output image, and third output image, respectively.

With regard to the first region R1 (i.e., block 223), the first output image X1 can be calculated using the first image I1, second image I2, and third image I3. For example, the first output image X1 can be calculated using equation (4):

$$X1 = W1 \times I1_{R1} + W2 \times I2_{R1} + W3 \times I3 \quad (4)$$

where $I1_{R1}$ and $I2_{R1}$ denote the first image I1 and the second image I2 inside the range of $FOV_3$ (e.g., block 223), respectively. W1, W2, and W3 denote the weighting factors of the first image I1, second image I2, and third image I3 inside $FOV_3$. The weighting factors W1, W2, and W3 are values between 0 and 1, and the relationship between the weighting factors W1, W2, and W3 can be expressed using equation (5):

$$W1 + W2 + W3 = 1 \quad (5)$$

Specifically, in response to the zooming factor being 1x, the weighting factor W1 of the first image I1 is $P_{1a}$ which is substantially equal to 1, and the weighting factors W2 (e.g., equal to $Q_{1a}$) and W3 (e.g., equal to $R_{1a}$) of the second image I2 and third image I3 are substantially equal to zero. That is, the whole first image I1 captured by the imaging section 211 is used as the first output image X1 in response to the zooming factor being 1x.

In the first stage, the zooming factor Kx of the camera device 100 is gradually adjusted from 1x to $k_2x$. The weighting factor W1 of the first image I1 gradually decreases from 1 to 0 or a predetermined ratio $P_{1b}$, the weighting factors W2 and W3 of the second image I2 and third image I3 may gradually increase to predetermined ratios $Q_{1b}$ and $R_{1b}$, respectively. In addition, the increment rate of the weighting factor W2 is higher than that of the weighting factor W3. It should be noted that the sum of the predetermined ratios $P_{1b}$, $Q_{1b}$, and $R_{1b}$ are also equal to 1. In some embodiments, the relationships between the weighting factors W1, W2, and W3 with respect to the zooming factor of the camera device 100 can be recorded in a lookup table stored in a non-volatile memory (not shown in FIG. 1) of the camera device 100. Alternatively, the processor 140 may use a linear function or a power function to determine the weighting factors W1, W2, and W3 with respect to the zooming factor of the camera device 100.

In some embodiments, when the zooming factor Kx of the camera device 100 is gradually adjusted from 1x to $k_px$ which is a zooming factor greater than $k_2$, the weighting factor W1 of the first image I1 gradually decreases from $P_{1a}$ to 0 (i.e., at zooming factor $k_p$), the weighting factors W2 and W3 of the second image I2 and third image I3 may also increase correspondingly.

In the second stage, the zooming factor Kx of the camera device 100 is gradually adjusted from $k_2x$ to $k_3x$. The weighting factor W1 of the first image I1 is maintained at $P_{1b}$ (e.g., 0), and the weighting factor W2 of the second image I2 may gradually decrease from $Q_{1b}$ to $Q_{1c}$ (e.g., 0), and the weighting factor W3 of the third image I3 may gradually increase from $R_{1b}$ to $R_{1c}$ (e.g., 1). In some embodiments, the relationships of the weighting factors W1, W2, and W3 with respect to the zooming factor of the camera device 100 can be recorded in a lookup table stored in a non-volatile memory (not shown in FIG. 1) of the camera device 100. Alternatively, the processor 140 may use a linear function or a power function to determine the weighting factors W1, W2, and W3 with respect to the zooming factor of the camera device 100.

In the third stage, when the zooming factor Kx of the camera device 100 is gradually adjusted from $k_3x$ to a greater zooming factor, the weighting factors W1 and W2 are maintained at 0, and the weighting factor W3 is kept at $R_{1c}$ (e.g., 1).

With regard to the second region R2 (i.e., region 231), the second output image X2 can be calculated using the first image I1 and the second image I2 because the FOV of the imaging section 213 only covers block 223 which is smaller than the FOVs of the imaging sections 211 and 212. For example, the second output image X2 can be calculated using equation (6):

$$X2 = W1 \times I1_{R2} + W2 \times I2_{R2} \quad (6)$$

where $I1_{R2}$ and $I2_{R3}$ respectively denote the first image I1 and the second image I2 inside the second region 231 which is a region inside $FOV_2$ (i.e., block 222) and outside $FOV_3$ (i.e., block 223). W1 and W2 respectively denote the weighting factors of the first image I1 and second image I2 inside $FOV_3$.

In the first stage, the zooming factor Kx of the camera device 100 is gradually adjusted from 1x to $k_2x$. The weighting factor W1 of the first image I1 may gradually decrease from the predetermined ratio $P_{2a}$ (e.g., 1) to $P_{2b}$ (e.g., 0), and the weighting factor W2 of the second image I2 may gradually increase from $Q_{2a}$ (e.g., 0) to $Q_{2b}$ (e.g., 1). It should be noted that the sum of the predetermined ratios $P_{2b}$, and $Q_{1b}$ are also equal to 1. In some embodiments, the relationships between the weighting factors W1, W2, and W3 can be recorded in a lookup table stored in a non-volatile memory (not shown in FIG. 1) of the camera device 100. Alternatively, the processor 140 may use a linear function or a power function to determine the weighting factors W1, W2, and W3.

In the second stage, the zooming factor Kx of the camera device 100 is gradually adjusted from $k_2x$ to $k_3x$. The weighting factor W1 of the first image I1 is maintained at $P_{2b}$ (e.g., 0), and the weighting factor W2 of the second image I2 is maintained at $Q_{2b}$ (e.g., 1). It should be noted that there is no third stage in this case because the camera device 100 is zooming into block 223 which is beyond the range of region 231.

With regard to the third region R3 (i.e., region 232), the third output image X3 can be calculated using the first image I1 because only the $FOV_1$ of the imaging section 211 may cover region 232 which is a region between $FOV_1$ (i.e., block 221) and $FOV_2$ (i.e., block 222). Accordingly, the weighting factor W1 of the first image I1 in the third region R3 can be kept at the predetermined ratio $P_{1a}$ (e.g., 1). It should be noted that there is no second and third stages in this case because the camera device 100 is zooming into block 222 or 223 which is beyond the range of region 232.

In the embodiments of FIG. 2B, the processor 140 may perform different image-fusion processes on different regions in the output image using the first image I1, second image I2, and third image I3 captured by the imaging sections 211, 212, and 213 so as to achieve smooth transition across different image regions in the output image. In addition, the weighting factors of the first image I1, second image I2, and third image I3 can be adjusted in different stages of zooming, as described above. Accordingly, the overall PPA of the output image generated by the camera device 100 will gradually increase from $PPA_1$ to $PPA_3$ as the zooming factor is gradually changed from 1x to $k_3x$, as illustrated in FIG. 2C.

In an embodiment, the weighting factors of the first image I1, second image I2, and third image I3 may also be affected by some other factors such as the object distance from the object to the camera device 100, the lighting condition, power consumption constraints of the camera device 100, or a combination thereof.

With regard to the factor of the object distance, when the object to be shot is very close to the camera device 100 (i.e., short object distance), the processor 140 may increase the weighting factors of the imaging sections having small PPAs. For example, the imaging sections with small PPAs (e.g., can be determined using a PPA threshold) in the camera device 100 are capable of capturing clear images of an object that is very close to the camera device 100 (i.e., short object distance), but the imaging sections with large PPAs may be not capable of capturing clear images of the object since due the longer focal length and/or narrower FOV. In this case, the processor 140 may shift the control point rightward such as increasing the predetermined zooming factor $k_p$ described in the aforementioned embodiments so as to use the images captured by the imaging sections having the small PPAs in a wider range of zooming factors, thereby improving the image quality of the output image. In addition, the weighting factors can be determined by DAC (digital-to-analog) values output from the digital-to-analog converter circuitry (not shown) in each imaging section in the camera device 100 while performing autofocusing. Similarly, the relationship between the object distance and the DAC values can be recorded in the lookup table in the camera device 100 in advance. Additionally or alternatively, the processor 140 may use a linear function or a power function to determine the weighting factors of the imaging sections, but the invention is not limited thereto.

With regard to the factor of the lighting condition, in some embodiments, when the processor 140 determines that the camera device 100 is in a dark scene using a well-known technique, the processor 140 may increase the weighting factors of the imaging sections having small PPAs. For example, the imaging sections with large PPAs (e.g., can be determined using a PPA threshold) in the camera device 100 may be equipped with a smaller aperture, resulting in more noises in the dark scene. In this case, the processor 140 may shift the control point rightward such as increasing the predetermined zooming factor $k_p$ described in the aforementioned embodiments so as to use the images captured by the imaging sections having the small PPAs in a wider range of zooming factors, thereby improving the image quality of the output image. In addition, the weighting factors can be determined by the ISO value(s) of at least one imaging sections in the camera device 100 when the camera device 100 is in an auto shooting mode (e.g., automatically determining the ISO value of the scene for each imaging section). Similarly, the relationship between the object distance and the ISO values can be recorded in the lookup table in the camera device 100 in advance. Additionally or alternatively, the processor 140 may use a linear function or a power function to determine the weighting factors of the imaging sections.

With regard to the factor of the power consumption constraints, in some embodiments, when there are M imaging sections in the camera device 100, the processor 140 may turn on at most N imaging sections at the same time due to a predefined power consumption threshold, where M is an integer equal to or larger than 3, and N is an integer between 1 and M. The processor 140 may select N imaging sections with the highest N-th FOV coverages for a given zooming factor from the M imaging sections. For example, the "FOV coverage" of a specific imaging section for a given zooming factor may indicate the percentage of pixels in the FOV of the given zooming factor that are covered by the FOV of the specific imaging section. In other words, the FOV coverage of the specific imaging section may indicate the relative size of the zoomed-in image "seen" by the specific imaging section.

For example, it is assumed that each imaging sections in the camera device 100 has the same power consumption. Give that (M, N)=(4, 3) and the zooming factor is 1.5x, the FOV coverages of the four imaging sections in the camera device 100, such as the imaging sections 211~214, may be 100%, 70%, 40%, and 20%, respectively. Because 100%, 70%, and 40% are the highest three FOV coverage values, the processor 140 may control the imaging sections 211, 212, and 213 to operate in a normal mode, and set the imaging section 214 to enter a low-power mode or standby mode, thereby achieving the highest FOV coverages with 3 activated imaging sections. In some embodiments, if two imaging sections in the camera device 100 have the same FOV coverage but different PPAs, the processor 140 may select the imaging section with a larger PPA, thereby achieving better image quality.

In another example, given that the number of imaging sections in the camera device 100 is 3 and the camera device 100 is placed in a dark scene, the processor 140 may determine that the camera device 100 is in a dark scene using well-known techniques, and then activate the imaging section having the smallest PPA, such as the imaging section 211, and control the remaining image sections to enter the low-power mode. Alternatively, the processor 140 may activate two imaging sections having the smallest two PPAs, such as the imaging sections 211 and 212, and control the remaining imaging section such as the imaging section 213 to enter the low-power mode. Because the imaging section 213 has the largest PPA, while performing the image-fusion process, the processor 140 may avoid using the image captured by the imaging section 213 that has more noises in the dark scene, thereby increasing the image quality of the output image.

Attention now is directed to FIG. 1, in some embodiments, the imaging section 110 can be regarded as a wide imaging section which has a relatively larger aperture, a relatively shorter focal length, and a relatively wider FOV. The imaging section 120 or 130 can be regarded as a telephoto (tele) imaging section which has a relatively smaller aperture, a relatively longer focal length, and a relatively narrower FOV. For example, the lens 111 and image sensor 112 in the imaging section 110 can be regarded as a wide lens and a wide image sensor, respectively. Similarly, the lens 121 and image sensor 122 in the imaging section 120 can be regarded as a telephoto lens and a telephoto image sensor, respectively. The imaging section 110 may have a relatively large aperture and a relatively short focal length.

The tele image captured by the imaging section 120 (i.e., the telephoto imaging section) may usually suffer from a high noise level in a low-light condition, and thus it is difficult to obtain a good de-noising result for the tele image, or the de-noised tele image may lose too many image details. In addition, a filtering kernel in a larger size is required for de-noising the tele image, and it indicates more power consumption.

However, the wide image and the tele image can be fused to improve the overall image quality of the preview image generated by the processor 140. For example, although the imaging section 120 (i.e., the telephoto imaging section) has a narrower FOV (e.g., second FOV), the image details in the second FOV is better than those in the same region inside the second FOV. Specifically, the tele image has a higher PPA value than the wide image in the region of the second FOV, and thus the tele image can be used for image fusion in the region of the second FOV. In the following sections, a method of multi-scale image fusion will be introduced, and the method is capable of generating images with fine details and suppressing noises at the same time. In addition, the method can be applied to any two imaging sections among at least 3 imaging sections in the camera device 100.

In the art of the invention, it is a challenge to achieve a better image quality of the output image in a dark scene. Conventional camera devices equipped with a wide imaging section and a telephoto imaging section on the market may use the wide image captured by the wide imaging section as the output image in the dark scene regardless of the zooming factor because the tele image captured by the telephoto imaging section may has a very high noise level. However, the method performed by the conventional camera devices may suffer from poor image quality using digital zooming.

Figure 3:
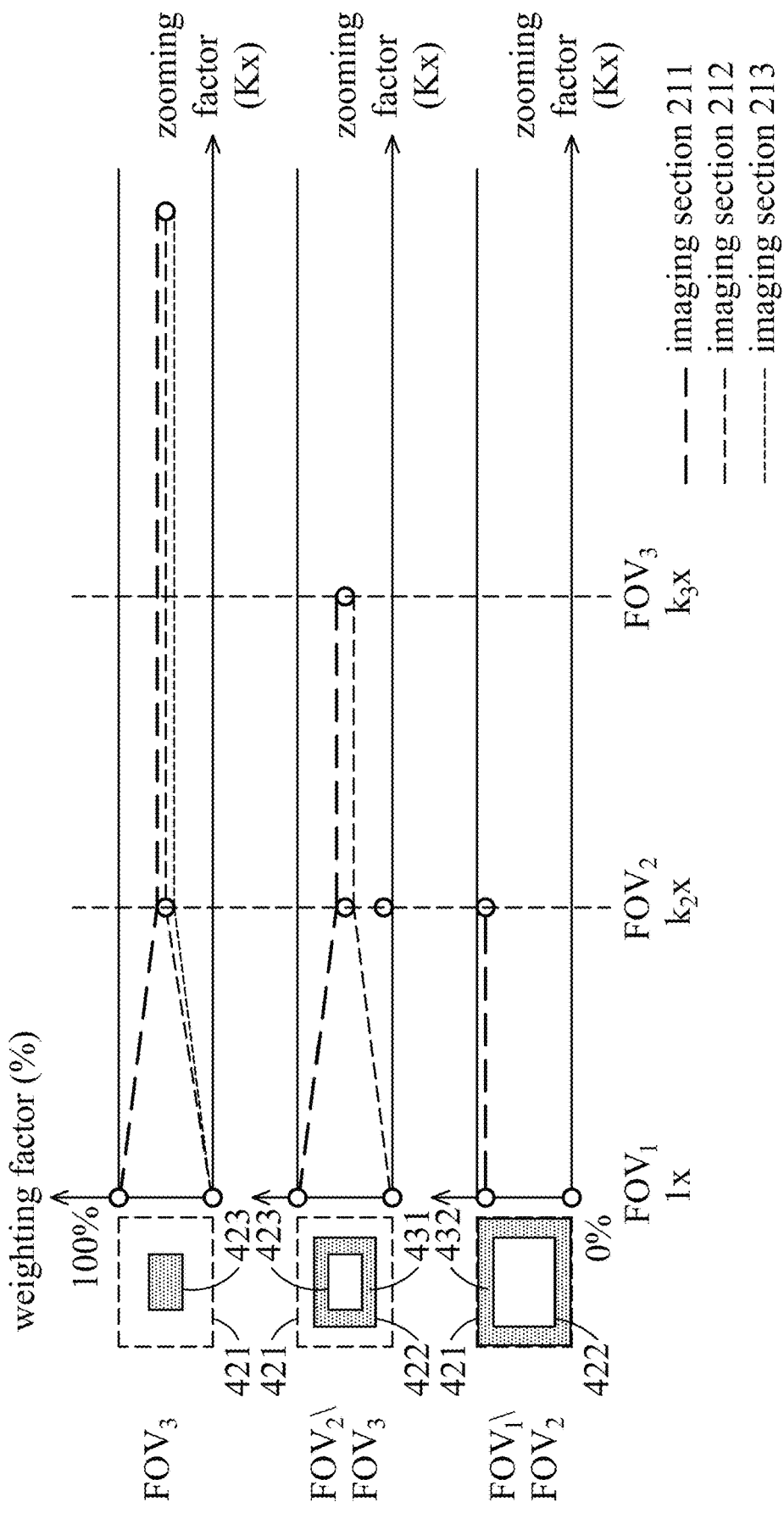
FIG. 3 is a diagram of the image-fusion process using images captured by three imaging sections in accordance with another embodiment of the invention.
Figure 4:
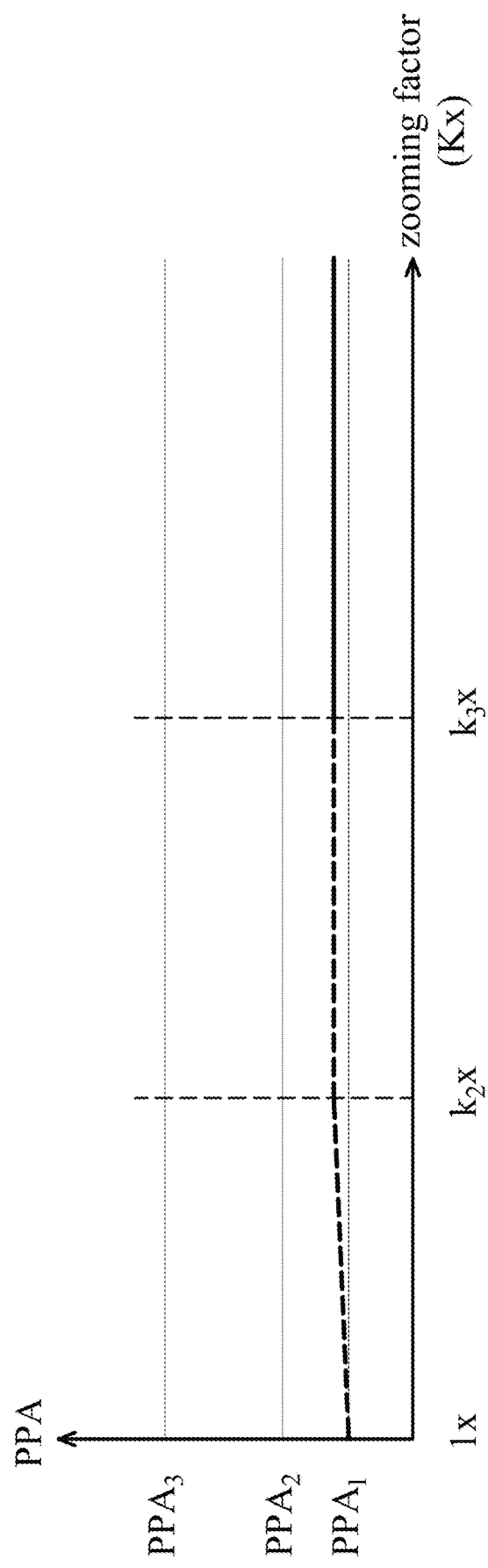
FIG. 4 is a diagram of the PPA values of the imaging sections with respect to the zooming factor in accordance with the embodiment of FIG. 3.

FIG. 3 is a diagram of the image-fusion process using images captured by three imaging sections in accordance with another embodiment of the invention. FIG. 4 is a diagram of the PPA values of the imaging sections with respect to the zooming factor in accordance with the embodiment of FIG. 3.

Referring to FIG. 2A and FIG. 3, in an embodiment, for purposes of description, the number of imaging sections in the camera device 100 is also 3, namely, imaging sections 211, 212, and 213. The imaging sections 211, 212, 213 have PPA values $PPA_1$, $PPA_2$, and $PPA_3$, respectively. The FOVs of the imaging sections 211, 212, and 213 can be referred to in FIG. 2A, where the $FOV_1$ of the imaging section 211 corresponds to the zooming factor of 1x, and the $FOV_2$ of the imaging section 212 corresponds to the zooming factor of $k_2 x$, and the $FOV_3$ of the imaging section 213 corresponds to the zooming factor of $k_3 x$. In addition, in the embodiment, the FOV1, FOV2, and FOV3 of the imaging sections 211, 212, and 213 are illustrated as blocks 211, 212, and 21N in FIG. 2A, respectively.

Specifically, the imaging sections 211, 212, and 213 may be designed for different focal lengths and FOVs. For example, referring to FIG. 2A, block 222 shows the range of FOV2 that is inside block 221 (i.e., FOV1), and block 223 shows the range of FOV3 that is inside block 221 (i.e., FOV1). In addition, the range of FOV3 is narrower than that of FOV2. It should be noted that the imaging section 213 may have the highest PPA value among three imaging sections 211~213 because the image sensors in the imaging sections 211~213 may have the same resolution (i.e., the same number of pixels) and the imaging section 213 has the narrowest FOV of FOV3.

In the embodiment of FIG. 3, different image fusion processes can also be performed to different regions inside FOV1. For example, the range of FOV1 (i.e., block 421) can be divided into a first region, a second region, and a third region. The first region may be the range of FOV3 (i.e., block 423), and the second region (i.e., region 431) may be the range inside the range of FOV2 (i.e., block 422) and outside the range of FOV3, and the third region (i.e., region 432) may be the range inside the range of FOV1 and outside the range of FOV2. Additionally, the output image generated by the processor 140 can be formed by the image-fusion results of the first region, second region, and third region, namely, the first output image, second output image, and third output image, respectively.

With regard to the first region R1 (i.e., block 223), the first output image X1 can be calculated using the first image I1', second image I2', and third image I3'. For example, the first output image X1 can be calculated using equation (7):

$$X1 = W1 \times I1_{R1}' + W2 \times I2_{R1}' + W3 \times I3 \qquad (7)$$

where $I1_{R1}'$ and $I2_{R1}'$ denote the first image I1 and the second image I2 inside the range of $FOV_3$ (e.g., block 423), respectively. W1, W2, and W3 denote the weighting factors of the first image I1', second image I2', and third image I3' inside the range of FOV3. The weighting factors W1, W2, and W3 are values between 0 and 1, and the relationship between the weighting factors W1, W2, and W3 can be expressed using equation (5):

$$W1 + W2 + W3 = 1 \qquad (8)$$

Specifically, in response to the zooming factor being 1x, the weighting factor W1 of the first image I1 is equal to 1, and the weighting factors W2 and W3 of the second image I2 and third image I3 are equal to zero. That is, the whole first image $I1_{R1}'$ captured by the imaging section 211 is used as the first output image X1 in response to the zooming factor being 1x.

In the first stage, the zooming factor Kx of the camera device 100 is gradually adjusted from 1x to a predetermined zooming factor Zx. The weighting factor W1 of the first image I1 gradually decreases from 1 to a predetermined ratio T1, the weighting factors W2 and W3 of the second image I2 and third image I3 may gradually increase from 0 to predetermined ratios T2 and T3, respectively. In addition, the increment rate of the weighting factor W2 may be slightly higher than or equal to that of the weighting factor W3. It should be noted that the sum of the predetermined ratios T1, T2, and T3 are also equal to 1. In some embodiments, the predetermined ratios T1, T2, and T3 may be equal to or different from each other, but the invention is not limited thereto.

Furthermore, in response to the processor 140 detecting that the camera device 100 being in a dark scene (e.g., the luminance of the scene below a predetermined threshold), the processor 140 may dynamically adjust the predetermined ratios T1, T2, and T3, where T1>T2>=T3. Specifically, in response to the camera device 100 being in the dark scene, the second image and third image captured by the imaging sections 212 and 213 may have very high noise levels, namely a first noise level and a second noise level, where the second noise level is higher than the first noise level. Thus, the processor 140 may decrease the predetermined ratios T2 and T3 for the second image and the third image, so that the noises in the fused output image can be reduced.

In some embodiments, the relationships of the weighting factors W1, W2, and W3 with respect to the zooming factor of the camera device 100 can be recorded in a lookup table stored in a non-volatile memory (not shown in FIG. 1) of the camera device 100. Alternatively, the processor 140 may use a linear function or a power function to determine the weighting factors W1, W2, and W3 with respect to the zooming factor, but the invention is not limited thereto. For example, the relationships of the weighting factors W1, W2, and W3 with respect to the zooming factor in a normal scene (e.g., the ISO value of the camera device is about 100) are illustrated in Table 1:

TABLE 1

|  | Zooming Factor | | | |
| --- | --- | --- | --- | --- |
|  | 1.0x | 1.5x | 2.0x | 3.0x |
| W1 for First Image | 1.0 | 0.4 | 0.4 | 0.4 |
| W2 for Second Image | 0.0 | 0.3 | 0.3 | 0.3 |
| W3 for Third Image | 0.0 | 0.3 | 0.3 | 0.3 |

In Table 1, the predetermined ratios T1, T2, and T3 may be 0.4, 0.3, and 0.3, respectively.

Additionally or alternatively, the weighting factors W1, W2, and W3 can also be determined by the ISO values of the imaging sections 211, 212, and 230 or the ISO value of the imaging section 211. Generally, the ISO value for the camera device 100 may range from around 50 or 100 up to around 800 to 8000. In response to the processor 140 determining that a larger ISO value is used by the camera device 100, the processor 140 may increase the weighting factor W1 and decrease the weighting factors W2 and W3.

For example, given that the zooming factor of the camera device 100 is 2.0x and the ISO value is 100, the weighting factors W1, W2, and W3 can be obtained as 0.4, 0.3, and 0.3 according to Table 1, respectively. The processor 140 may adjust the weighting factors W1, W2, and W3 according to Table 2 which records the relationships of the weighing factors W1, W2, and W3 with respect to the ISO value using a fixed zooming factor of 2.0x.

TABLE 2

|  | ISO value | | | |
| --- | --- | --- | --- | --- |
|  | 100 | 1000 | 4000 | 8000 |
| W1 for First Image | 0.4 | 0.5 | 0.6 | 0.8 |
| W2 for Second Image | 0.3 | 0.25 | 0.2 | 0.1 |
| W3 for Third Image | 0.3 | 0.25 | 0.2 | 0.1 |

It should be noted that Table 2 is designed for a zooming factor of 2.0x. The relationships of the weighting factors W1, W2, and W3 with respect to the ISO value using a different zooming factor can be recorded in another lookup table in a similar manner. Specifically, a larger ISO value may indicate a "darker" scene in which the camera device 100 is located. The noise level of the telephoto imaging section (e.g., imaging section 212 or 213) may become higher when the ISO value of the camera device 100 becomes larger. Thus, the weighting factors W2 and W3 for the second image and the third image may be decreased to reduce the impact of the noises in the fused output image.

In the second stage, the zooming factor Kx of the camera device 100 is gradually adjusted from Zx to $k_2x$, and the weighting factors W1, W2, and W3 may be kept at the predetermined ratios T1, T2, and T3, respectively. It should be noted that the sum of the predetermined ratios T1, T2, and T3 are also equal to 1. In some embodiments, the predetermined ratios T1, T2, and T3 may be equal to or different from each other, but the invention is not limited thereto.

In the third stage, the zooming factor Kx of the camera device 100 is gradually adjusted from $k_2x$ to $k_3x$, and the weighting factors W1, W2, and W3 may be kept at the predetermined ratios T1, T2, and T3, respectively. In the fourth stage, the zooming factor Kx of the camera device 100 is gradually adjusted from $k3x$ to a greater zooming factor, and the weighting factors W1, W2, and W3 may also be kept at the predetermined ratios T1, T2, and T3, respectively.

Specifically, in response to the zooming factor being equal to or greater than the predetermined zooming factor Zx, the weighting factors W1, W2, and W3 may be kept at the predetermined ratios T1, T2, and T3.

With regard to the second region R2 (i.e., region 431), the second output image X2 can be calculated using the first image I1' and second image I2' because the FOV3 of the imaging section 213 only covers block 423 which is smaller than the FOV1 and FOV2 of the imaging sections 211 and 212. For example, the second output image X2 can be calculated using equation (6):

$$X2 = W1 \times I1_{R2}' + W2 \times I2_{R2}' \qquad (6)$$

where $I1_{R2}'$ and $I2_{R2}'$ respectively denote the first image I1' and second image I2', inside the second region 431 which is a region inside FOV2 (i.e., block 222) and outside FOV3 (i.e., block 223). W1 and W2 respectively denote the weighting factors of the first image I1' and second image I2', in the second region.

In the first stage, the zooming factor Kx of the camera device 100 is gradually adjusted from 1x to Zx. The weighting factor W1 of the first image I1' may gradually decrease from 1 to a predetermined ratio T4, and the weighting factor W2 of the second image I2' may gradually increase from 0 to a predetermined ratio T5. It should be noted that the sum of the predetermined ratios T4 and T5 are also equal to 1.

In the second stage and third stage, the zooming factor Kx of the camera device 100 is gradually adjusted from Zx to $k_2x$, and from $k_2x$ to $k_3x$, and the weighting factor W1 and W2 are kept at the predetermined ratios T4 and T5, respectively.

With regard to the third region R3 (i.e., region 432), the third output image X3 can be calculated using the first image I1' because only the FOV1 of the imaging section 211 may cover the third region 432 which is a region inside FOV1 (i.e., block 421) and outside FOV2 (i.e., block 422). Accordingly, the weighting factor W1 of the first image I1' in the third region R3 can be kept at 1. It should be noted that there is no second, third, and fourth stages in this case because the camera device 100 is zooming into block 422 or 423 which is beyond the range of region 432.

In the embodiments of FIGS. 3~4, the processor 140 may perform different image-fusion processes on different regions in the output image using the first image I1', second image I2', and third image I3' captured by the imaging sections 211, 212, and 213 so as to achieve smooth transition across different image regions in the output image. In addition, the weighting factors of the first image I1', second image I2', and third image I3' can be adjusted in different stages of zooming, as described above. The relationship of the PPA values $PPA_1$, $PPA_2$, $PPA_3$ of the imaging sections 211, 212, and 213 with respect to the zooming factor Kx is shown in FIG. 4. It can be understood that the overall PPA of the fused output image may be kept at a constant value due to the aforementioned image-fusion processes in different regions.

Figure 5A:
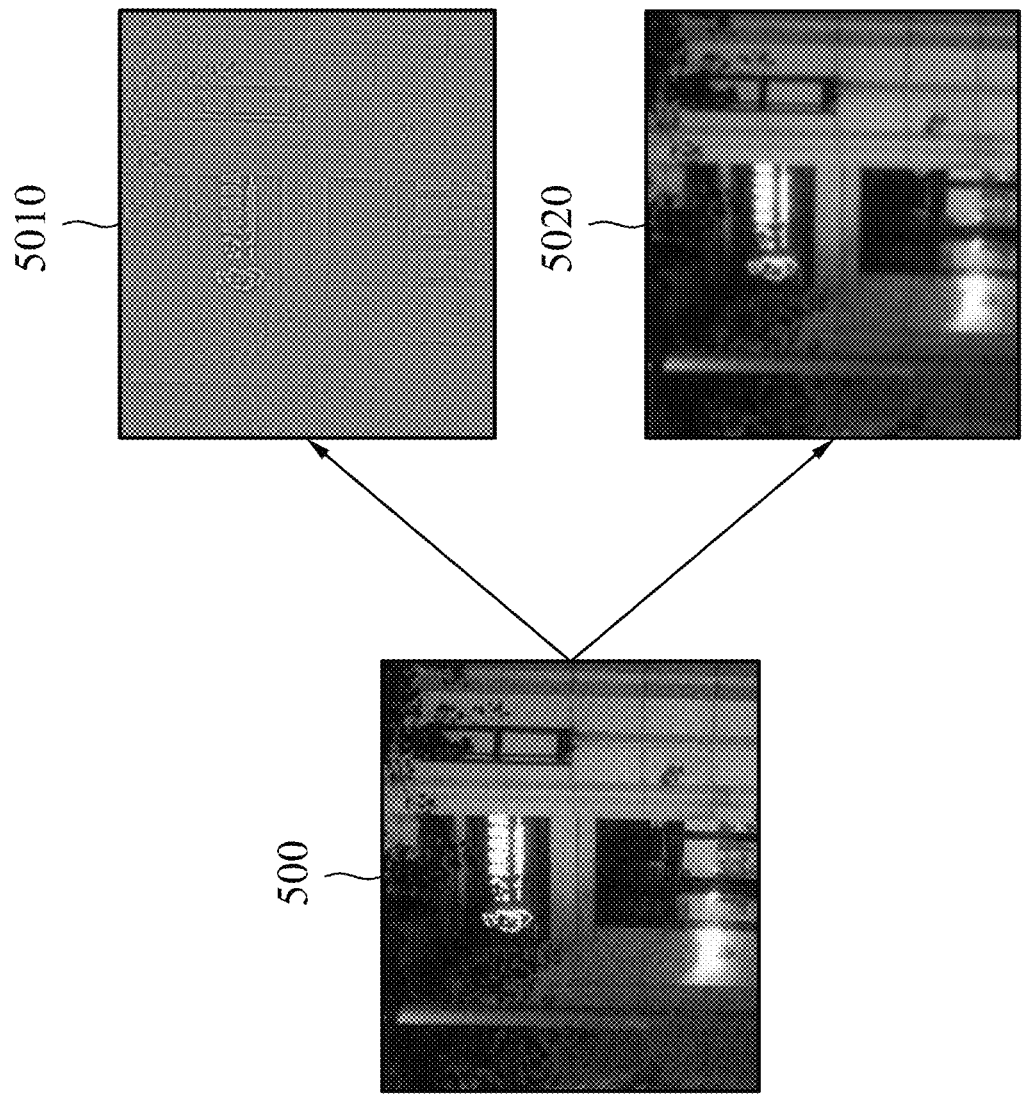
FIG. 5A is a diagram of the high-frequency component and low-frequency component of an image captured by an imaging section of the camera device in accordance with an embodiment of the invention.
Figure 5B:
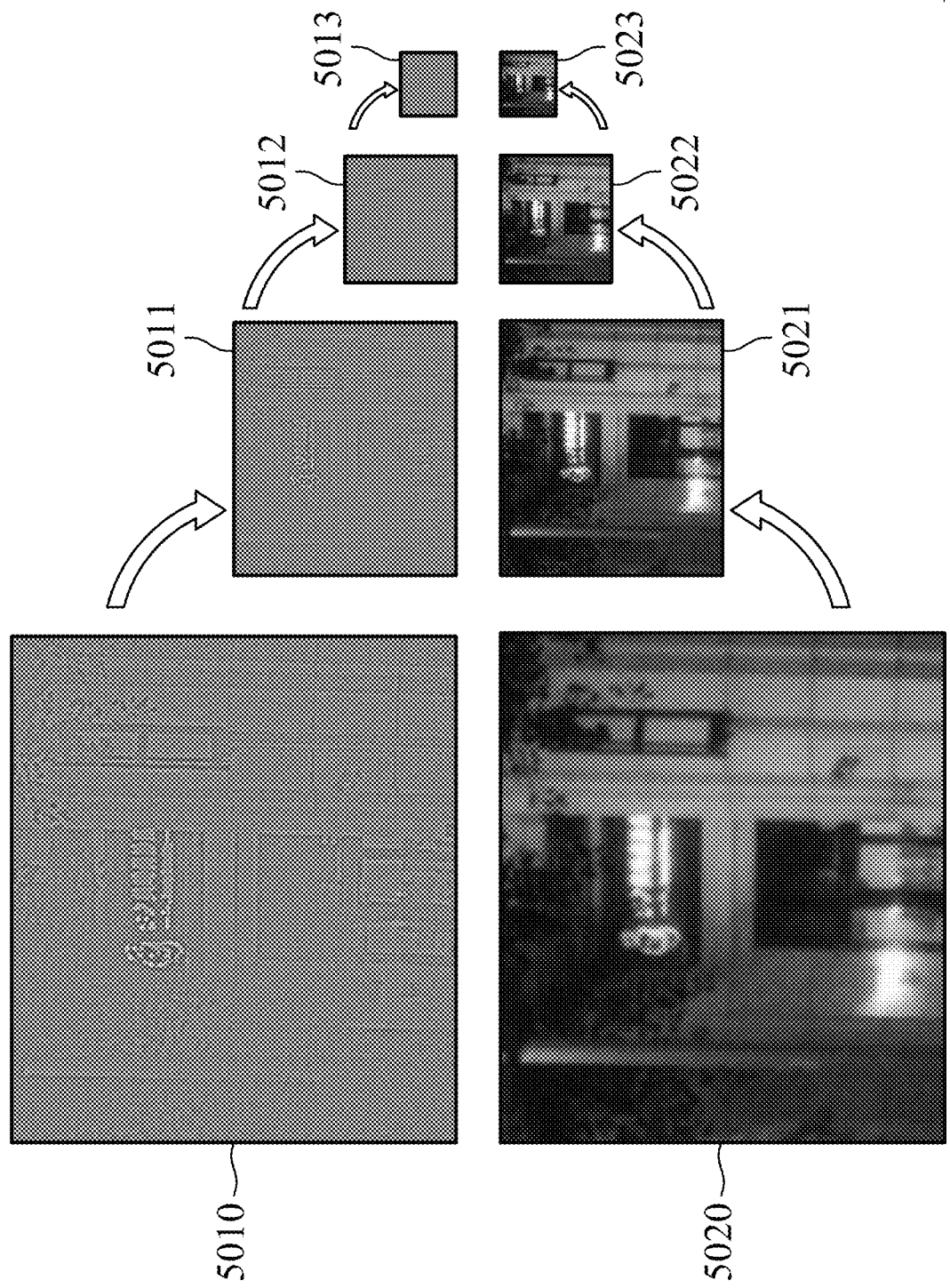
FIG. 5B is a diagram of the high-frequency component and low-frequency component of an image captured by an imaging section of the camera device in accordance with an embodiment of the invention.
Figure 5C:
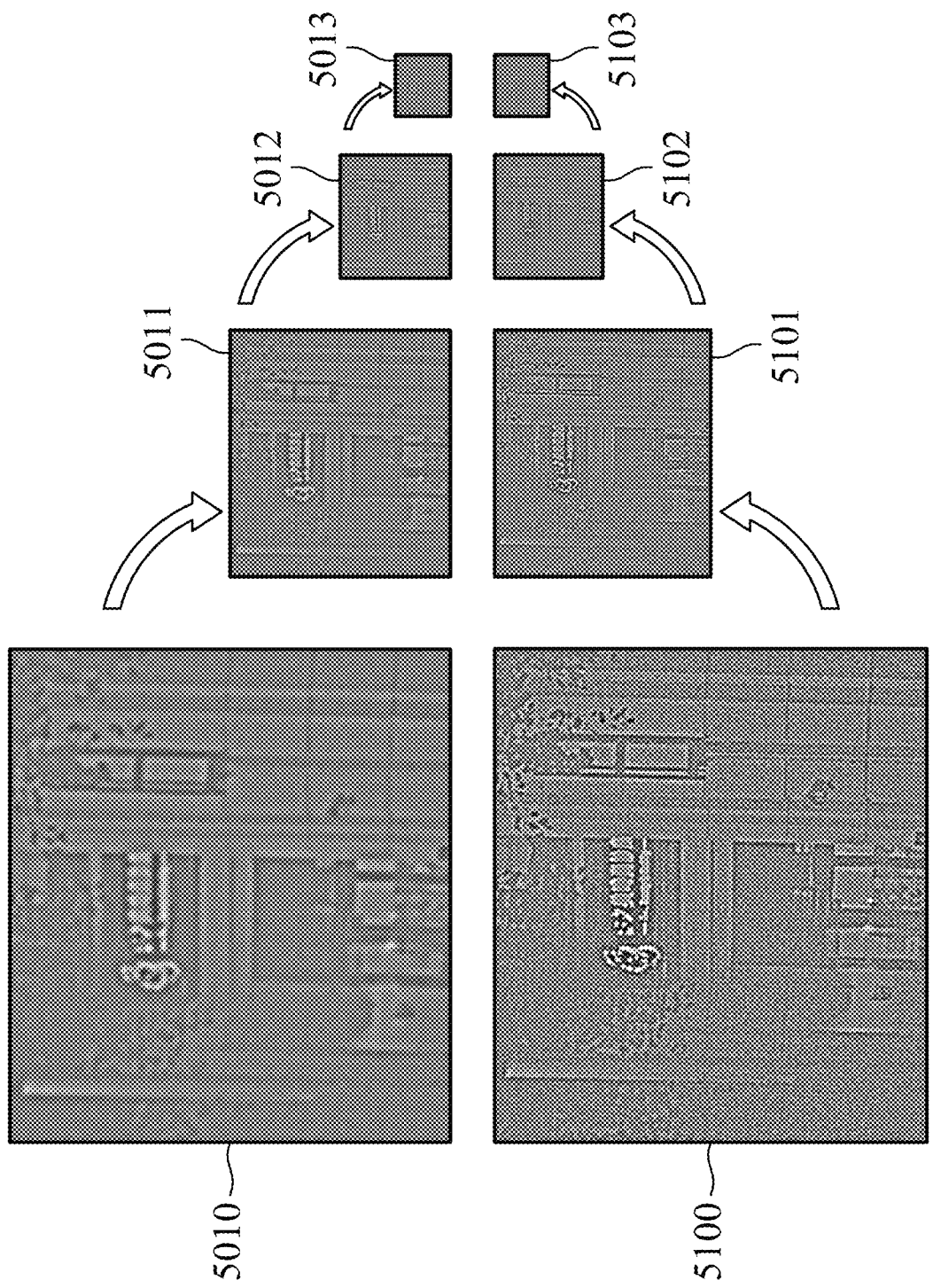
FIG. 5C is a diagram of the high-frequency components in multiple decomposition levels of the first image and second image captured by an imaging section of the camera device in accordance with an embodiment of the invention.

FIG. 5A is a diagram of the high-frequency component and low-frequency component of an image captured by an imaging section of the camera device in accordance with an embodiment of the invention. FIG. 5B is a diagram of the high-frequency component and low-frequency component of an image captured by an imaging section of the camera device in accordance with an embodiment of the invention. FIG. 5C is a diagram of the high-frequency components in multiple decomposition levels of the first image and second image captured by an imaging section of the camera device in accordance with an embodiment of the invention.

In an embodiment, each of the first image, second image, third image captured by the imaging section 211, 212, and 213 can be divided into a low-frequency component and a high-frequency component using well-known techniques in the art. Referring to FIG. 5A, for example, image 500 may be the first image captured by the imaging section 211, and image 500 is divided into a high-frequency component 5010 and a low-frequency component 5020. In addition, a multi-scale decomposition method (e.g., may include, but not limited to, Gaussian pyramid, Laplacian pyramid, wavelet transform, etc.) can be used to derive various high-frequency components in different scales. As shown in FIG. 5B, the high-frequency component 5010 denotes the high-frequency component in decomposition level 0 (i.e., original size of 100%), and high-frequency components 5011, 5012, 5013 denote the high-frequency components in decomposition level 1 (i.e., 50% in each dimension), level 2 (i.e., 22.5% in each dimension), and level 3 (i.e., 12.25% in each dimension), respectively. In addition, the low-frequency component 5020 denotes the low-frequency component in decomposition level 0 (i.e., original size of 100%), and low-frequency components 5021, 5022, 5023 denote the low-frequency components in decomposition level 1, level 2, and level 3, respectively. Similarly, the second image and third image captured by the imaging sections 212 and 213 can also be divided into a respective high-frequency component and low-frequency component (not shown in FIG. 5B).

For purposes of description, the image-fusion process can be performed using the high-frequency components of the first image and the second image. For example, referring to FIG. 5C, high-frequency components 5100, 5101, 5102, and 5103 denote the high-frequency components of the second image in decomposition level 0, level 1, level 2, and level 3, respectively. In addition, since the first image and the second image may overlap within the range of FOV2, the first image within the range of FOV2 is up-scaled to match the dimension of the second image. In the embodiment, the weighting factor for the high-frequency components of the first image and the second image vary depending on the decomposition level. For example, in decomposition level 3, the weighting factor of the high-frequency component 5103 may be 100% and that of the high-frequency component 5013 may be 0%, and it indicates that the output high-frequency component in decomposition level 3 may be the whole high-frequency component 5103. In decomposition level 2, the weighting factor of the high-frequency component 5102 may be 90% and that of the high-frequency component 5012 may be 10%. In decomposition level 1, the weighting factor of the high-frequency component 5101 may be 75% and that of the high-frequency component 5011 may be 25%. In decomposition level 0, the weighting factor of the high-frequency component 5100 may be 50% and that of the high-frequency component 5010 may be 50%. It should be noted that the invention is not limited to the aforementioned weighting factors for the high-frequency components during image blending.

Accordingly, the resulting high-frequency component in each composition level can be calculated by performing image blending using the aforementioned weighting factors. Furthermore, a multi-scale image-reconstruction process well-known to persons skilled in the art can be performed to reconstruct the fused output image using the low-frequency component of the first image and the resulting high-frequency component obtained from the image blending. It should be noted that the low-frequency component of the second image is not used due to its high noise level. Thus, the resulting output image may keep the low-frequency component of the first image and the image details of the blended high-frequency component, thereby achieving better image quality and suppressing the noises of the resulting output image.

Figure 6:
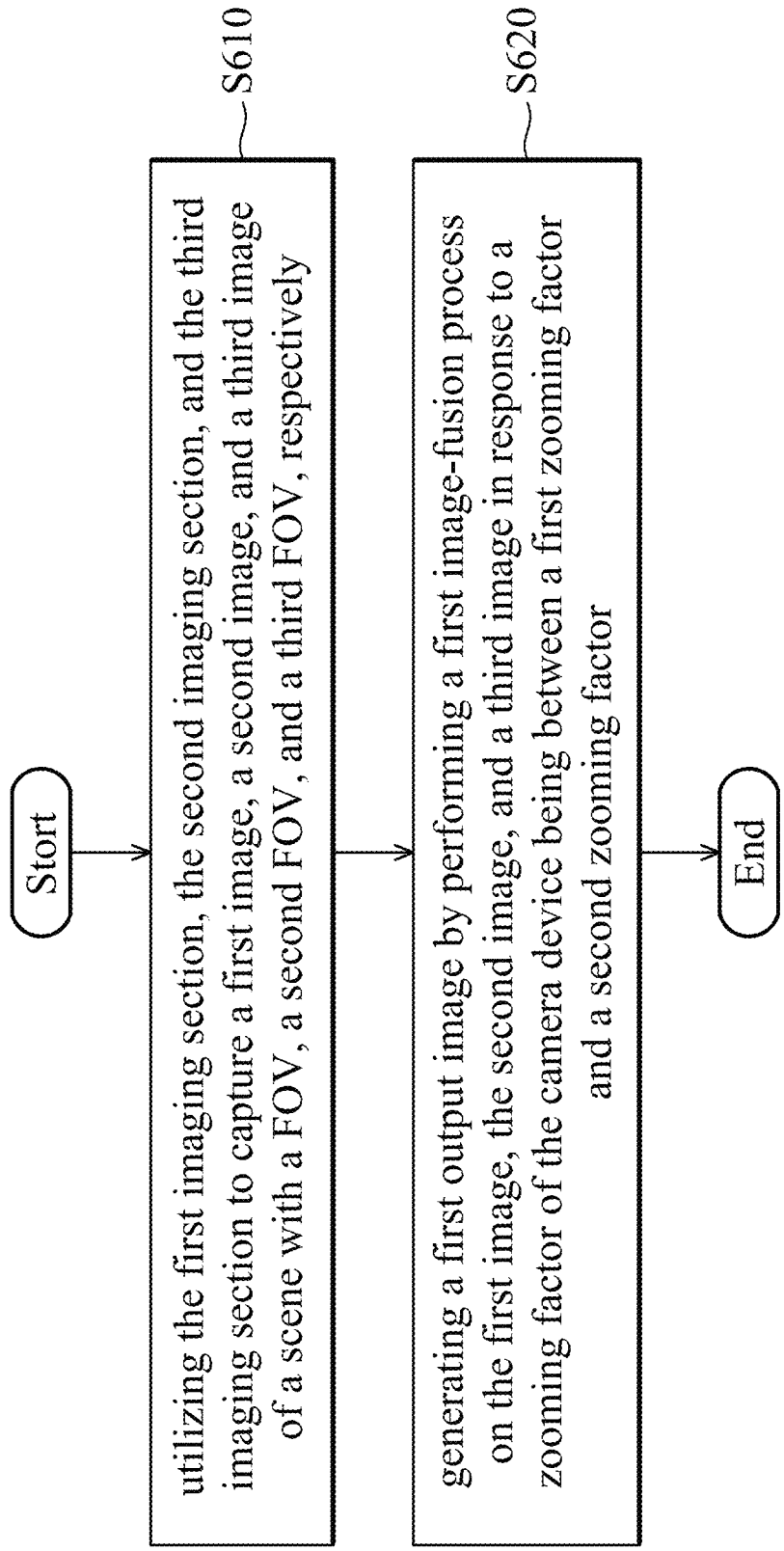
FIG. 6 is a flow chart of a method for image fusion in a camera device in accordance with an embodiment of the invention.

FIG. 6 is a flow chart of a method for image fusion in a camera device in accordance with an embodiment of the invention. The method includes the following steps:

Step S610: utilizing the first imaging section, the second imaging section, and the third imaging section to capture a first image, a second image, and a third image of a scene with a FOV, a second FOV, and a third FOV, respectively. For example, the first FOV is wider than the second FOV, and the second FOV is wider than the third FOV, and the second zooming factor is greater than the first zooming factor. In some embodiments, the first zooming factor may be 1x and the second zooming factor may be 2x. In some other embodiments, the first zooming factor may be 2x and the second zooming factor may be 3x, but the invention is not limited thereto.

Step S620: generating a first output image by performing a first image-fusion process on the first image, the second image, and a third image in response to a zooming factor of the camera device being between a first zooming factor and a second zooming factor. For example, the first image-fusion process can be performed on the overlapped region (e.g., first region such as the third FOV) between the first image, second image, and third image, and all of the first image, second image, third image are used for the first image-fusion process as possible, such as the zooming factor of the camera device being between the first zooming factor (e.g., 1x for the first imaging section) and the second zooming factor (e.g., k2x for the second imaging section). In addition, a second image-fusion process can be performed on the first image and the second image inside the second FOV and outside the third FOV, and a portion of the first image that is inside the first FOV and outside the second FOV.

In view of the above, a camera device and methods for image fusion in the camera device have been provided to achieve a better image quality and suppressing noises in the output image during image zooming.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A camera device, comprising:
a first imaging section, configured to capture a first image of a scene with a first field of view (FOV);
a second imaging section, configured to capture a second image of the scene with a second FOV;
a third imaging section, configured to capture a third image of the scene with a third FOV; and
a processor, coupled to the first imaging section, the second imaging section, and the third imaging section, and configured to generate a first output image by performing a first image-fusion process on the first image, the second image, and a third image in response to a zooming factor of the camera device being between a first zooming factor and a second zooming factor,
wherein the first FOV is wider than the second FOV, and the second FOV is wider than the third FOV, and the second zooming factor is greater than the first zooming factor.

2. The camera device as claimed in claim 1, wherein the first zooming factor corresponds to the first FOV of the first imaging section, and the second zooming factor corresponds to the second FOV of the second imaging section,
wherein the processor is configured to perform the first image-fusion process on the first image inside a first region, the second image inside a first region, and the third image, and the first region denotes the third FOV.

3. The camera device as claimed in claim 2, wherein in response to the zooming factor being between the first zooming factor and the second zooming factor, the processor is configured to decrease a first weighting factor of the first image inside the third FOV to zero in proportion to the zooming factor, and increase a second weighting factor of the second image inside the third FOV to a first determined ratio in proportion to the zooming factor, and increase a third weighting factor of the third image to a second predetermined ratio in proportion to the zooming factor,
wherein a sum of the first predetermined ratio and the second predetermined ratio is equal to 1.

4. The camera device as claimed in claim 2, wherein a third zooming factor corresponds to the third FOV of the third imaging section, and the third zooming factor is greater than the second zooming factor,
wherein in response to the zooming factor being between the second zooming factor and the third zooming factor, the processor is configured to decrease the second weighting factor of the second image to zero in proportion to the zooming factor, and increase the third weighting factor of the third image to 1 in proportion to the zooming factor.

5. The camera device as claimed in claim 2, wherein the processor is further configured to generate a second output image by performing a second image-fusion process on the first image inside a second region and the second image, and the second region denotes a region inside the second FOV and outside the third FOV,
wherein the processor is further configured to use the first image inside a third region as a third output image in response to the zooming factor being between the first zooming factor and the second zooming factor, and the third region denotes a region inside the first FOV and outside the second FOV.

6. The camera device as claimed in claim 3, wherein the processor is further the third weighting factor according to a digital-to-analog converter (DAC) value from respective DAC circuitry of the first imaging section, the second imaging section, and the third imaging section.

7. The camera device as claimed in claim 3, wherein the processor is further configured to adjust each of the first weighting factor, the second weighting factor, and the third weighting factor according to an ISO value detected by the first imaging section.

8. The camera device as claimed in claim 3, wherein the camera device further comprises M imaging sections including the first imaging section, the second imaging section, and the third imaging section,
where in response to a power-consumption constraint for activating at most N imaging sections of the camera device at the same time, the processor activates N imaging sections having the highest N FOV coverages from the M imaging sections,
wherein M is an integer equal to or larger than 3, and N is an integer between 1 and M.

9. The camera device as claimed in claim 2, wherein in response to the zooming factor being between the first zooming factor and a predetermined zooming factor that is smaller than the second zooming factor, the processor is further configured to decrease a first weighting factor of the first image inside the third FOV to a first predetermined ratio in proportion to the zooming factor, and increase a second weighting factor of the second image inside the third FOV to a second determined ratio in proportion to the zooming factor, and increase a third weighting factor of the third image to a third predetermined ratio in proportion to the zooming factor,
wherein a sum of the first predetermined ratio, the second predetermined ratio, and the third predetermined ratio is equal to 1.

10. The camera device as claimed in claim 9, wherein in response to an average luminance of the first image being lower than a predetermined luminance and/or an ISO value of the first image being higher than a predetermined threshold, the processor is further configured to increase the first predetermined ratio, and decrease the second predetermined ratio and the third predetermined ratio.

11. The camera device as claimed in claim 9, wherein the processor is further configured to perform a multi-scale decomposition method on a respective high-frequency component of each of the first image, the second image, and the third image in the first image-fusion process, wherein in response to a greater decomposition level of the first image-fusion process, the first weighting factor for a high-frequency component is increased and the second weighting factor and the third weighting factor are reduced.

12. A method for image fusion in a camera device equipped with a first imaging section, a second imaging section, and a third imaging section, the method comprising:
utilizing the first imaging section, the second imaging section, and the third imaging section to capture a first image, a second image, and a third image of a scene with a first field of view (FOV), a second FOV, and a third FOV, respectively; and
generating a first output image by performing a first image-fusion process on the first image, the second image, and a third image in response to a zooming factor of the camera device being between a first zooming factor and a second zooming factor,
wherein the first FOV is wider than the second FOV, and the second FOV is wider than the third FOV, and the second zooming factor is greater than the first zooming factor.

13. The method as claimed in claim 12, wherein the first zooming factor corresponds to the first FOV of the first imaging section, and the second zooming factor corresponds to the second FOV of the second imaging section, and the method further comprises:
performing the first image-fusion process on the first image inside a first region, the second image inside a first region, and the third image, and the first region denotes the third FOV.

14. The method as claimed in claim 12, further comprising:
in response to the zooming factor being between the first zooming factor and the second zooming factor, decreasing a first weighting factor of the first image inside the third FOV to zero in proportion to the zooming factor, increasing a second weighting factor of the second image inside the third FOV to a first determined ratio in proportion to the zooming factor, and increasing a third weighting factor of the third image to a second predetermined ratio in proportion to the zooming factor,
wherein a sum of the first predetermined ratio and the second predetermined ratio is equal to 1.

15. The method as claimed in claim 12, wherein a third zooming factor corresponds to the third FOV of the third imaging section, and the third zooming factor is greater than the second zooming factor, and the method further comprises:
in response to the zooming factor being between the second zooming factor and the third zooming factor, decreasing the second weighting factor of the second image to zero in proportion to the zooming factor, and increasing the third weighting factor of the third image to 1 in proportion to the zooming factor.

16. The method as claimed in claim 12, further comprising:
generating a second output image by performing a second image-fusion process on the first image inside a second region and the second image, and the second region denotes a region inside the second FOV and outside the third FOV; and
using the first image inside a third region as a third output image in response to the zooming factor being between the first zooming factor and the second zooming factor, and the third region denotes a region inside the first FOV and outside the second FOV.

17. The method as claimed in claim 14, further comprising:
adjusting each of the first weighting factor, the second weighting factor, and the third weighting factor according to a digital-to-analog converter (DAC) value from respective DAC circuitry of the first imaging section, the second imaging section, and the third imaging section.

18. The method as claimed in claim 14, further comprising:
adjusting each of the first weighting factor, the second weighting factor, and the third weighting factor according to an ISO value detected by the first imaging section.

19. The method as claimed in claim 14, wherein the camera device further comprises M imaging sections including the first imaging section, the second imaging section, and the third imaging section, and the method further comprises:
in response to a power-consumption constraint for activating at most N imaging sections of the camera device at the same time, activating N imaging sections having the highest N FOV coverages from the M imaging sections, wherein M is an integer equal to or larger than 3, and N is an integer between 1 and M.

20. The method as claimed in claim 13, further comprising:
in response to the zooming factor being between the first zooming factor and a predetermined zooming factor that is smaller than the second zooming factor, decreasing a first weighting factor of the first image inside the third FOV to a first predetermined ratio in proportion to the zooming factor, increasing a second weighting factor of the second image inside the third FOV to a second determined ratio in proportion to the zooming factor, and increasing a third weighting factor of the third image to a third predetermined ratio in proportion to the zooming factor,
wherein a sum of the first predetermined ratio, the second predetermined ratio, and the third predetermined ratio is equal to 1.

21. The method as claimed in claim 20, further comprising:
in response to an average luminance of the first image being lower than a predetermined luminance and/or an ISO value of the first image being higher than a predetermined threshold, increasing the first predetermined ratio, and decrease the second predetermined ratio and the third predetermined ratio.

22. The method as claimed in claim 20, further comprising:
performing a multi-scale decomposition method on a respective high-frequency component of each of the first image, the second image, and the third image in the first image-fusion process; and
in response to a greater decomposition level of the first image-fusion process, the first weighting factor for a high-frequency component is increased and the second weighting factor and the third weighting factor are reduced.

* * * * *